(12) United States Patent
Currie et al.

(10) Patent No.: US 11,096,330 B2
(45) Date of Patent: Aug. 24, 2021

(54) RETENTION MECHANISM FOR AGRICULTURAL MACHINERY

(71) Applicant: Hustler Equipment Limited, Hastings (NZ)

(72) Inventors: James Robert Currie, Hastings (NZ); Richard Andrew Currie, Hastings (NZ)

(73) Assignee: Hustler Equipment Limited, Hastings (NZ)

( * ) Notice: Subject to any disclaimer, the term of this patent is extended or adjusted under 35 U.S.C. 154(b) by 158 days.

(21) Appl. No.: 16/341,744

(22) PCT Filed: Oct. 12, 2017

(86) PCT No.: PCT/NZ2017/050133
§ 371 (c)(1),
(2) Date: Apr. 12, 2019

(87) PCT Pub. No.: WO2018/070884
PCT Pub. Date: Apr. 19, 2018

(65) Prior Publication Data
US 2020/0045867 A1    Feb. 13, 2020

(30) Foreign Application Priority Data

Oct. 14, 2016   (NZ) ........................ 725283

(51) Int. Cl.
*A01D 87/12*       (2006.01)
*B66F 9/18*        (2006.01)
*A01B 73/00*       (2006.01)

(52) U.S. Cl.
CPC .............. *A01D 87/127* (2013.01); *B66F 9/18* (2013.01); *A01B 73/00* (2013.01)

(58) Field of Classification Search
CPC ..... A01B 59/006; A01B 59/066; A01B 73/00; A01D 87/127; A01D 87/12; A01D 87/122;
(Continued)

(56) References Cited

U.S. PATENT DOCUMENTS 4,002,147 A    1/1977  Feterl
4,078,733 A    3/1978  Gebruder
(Continued)

FOREIGN PATENT DOCUMENTS

AU    581430     2/1986
DE    2556234    6/1977
(Continued)

OTHER PUBLICATIONS

International Preliminary Report on Patentabilitiy for International Application No. PCT/NZ2017/050133 dated Apr. 2019 (9 pages).
(Continued)

*Primary Examiner* — Gregory W Adams
(74) *Attorney, Agent, or Firm* — Merchant & Gould P.C.

(57) ABSTRACT

A fork assembly including a retention mechanism to retain an agricultural machine having a remotely controllable moveable element that is moveable between a number of positions. The retention mechanism includes a control element positioned so that, when engaged with the agricultural machine, the movement of the control element due to movement associated with the remotely controllable moveable element is arranged to cause actuation and deactuation of the retention mechanism.

13 Claims, 13 Drawing Sheets

(58) Field of Classification Search
CPC ....... A01D 2087/128; B66F 9/00; B66F 9/18; B66F 9/12; Y10S 241/605; A01F 29/005
See application file for complete search history.

(56) References Cited

U.S. PATENT DOCUMENTS

| | | | |
|---|---|---|---|
| 4,266,899 A | | 5/1981 | Skeem |
| 4,443,146 A | | 4/1984 | Duncan |
| 6,045,314 A | * | 4/2000 | Greene ................ A01D 87/127 119/60 |
| 6,767,175 B2 | | 7/2004 | Fujita et al. |
| 7,156,333 B2 | | 1/2007 | Lepage et al. |
| 7,967,545 B2 | | 6/2011 | Lauvdal |
| 2003/0156934 A1 | | 8/2003 | Fujita et al. |
| 2005/0035232 A1 | | 2/2005 | Lepage et al. |

FOREIGN PATENT DOCUMENTS

| | | |
|---|---|---|
| DE | 202004004342 | 6/2004 |
| EP | 3045028 | 7/2016 |
| FR | 2511963 | 3/1983 |
| FR | 3033225 | 9/2016 |
| JP | 08333097 | 12/1996 |
| JP | 2000026090 | 9/1999 |
| JP | 2003261300 | 9/2003 |
| JP | 2001316095 | 11/2004 |
| JP | 2006240837 | 9/2006 |
| NZ | 196268 | 9/1986 |
| WO | 2001000440 | 1/2004 |
| WO | 2010120185 | 10/2010 |
| WO | 2017105253 | 6/2017 |
| WO | 2018115862 A1 | 6/2018 |

OTHER PUBLICATIONS

"International Search Report for International Application No. PCT/NZ2017/050133 dated Dec. 14, 2017 (7 pages)".

"International Written Opinon for International Application No. PCT/NZ2017/050133 dated Dec. 14, 2017 (8 pages)".

* cited by examiner

RETENTION MECHANISM FOR
AGRICULTURAL MACHINERY

This application is a National Stage Application of PCT/NZ2017/050133, filed 12 Oct. 2017, which claims benefit of Serial No. 725283, filed 14 Oct. 2016 in New Zealand and which applications are incorporated herein by reference. To the extent appropriate, a claim of priority is made to each of the above disclosed applications.

FIELD

This invention relates to a retention mechanism for maintaining a fork assembly engaged with an agricultural machine when it is elevated above the ground.

BACKGROUND

It is common for a range of agricultural machines to be transported by engaging the forks or tines of a tractor fork assembly into one or more sleeves of a piece of agricultural machinery. There is a danger when the forks or tines are downwardly inclined, or during changes in vehicle velocity, that the machine may slide off the forks or tines.

Manual methods of securing machines to fork assemblies are known but may be inconvenient and require operator diligence to ensure the machinery is secure. Other mechanisms may require adaptation of agricultural machines to enable the retention mechanisms to work.

It is an object of the invention to provide an automatic mechanism for securing a machine to a fork assembly or at least a more convenient mechanism or to at least provide the public with a useful choice.

SUMMARY

According to one example embodiment there is provided a fork assembly for attachment to an agricultural machine having a remotely controllable moveable element that is moveable between at least a first and a second position including:
 a. a fork having one or more tines; and
 b. a retention mechanism for locking an agricultural machine to the fork assembly including a control element positioned so that, when engaged with the agricultural machine, the movement of the control element due to movement associated with the remotely controllable movement element is arranged to cause actuation and deactuation of the retention mechanism.

According to a further aspect there is provided an agricultural machine assembly including:
 a. a fork assembly having one or more forks or tines;
 b. an agricultural machine arranged to engage via the one or more forks or tines having a remotely controllable moveable element that is moveable between at least a first and a second position; and
 c. a retention mechanism which locks the agricultural machinery to the fork assembly controlled by a control element that engages with the moveable element of the agricultural machine to cause actuation and deactuation of the retention mechanism as the moveable element is moved between the first and second position.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
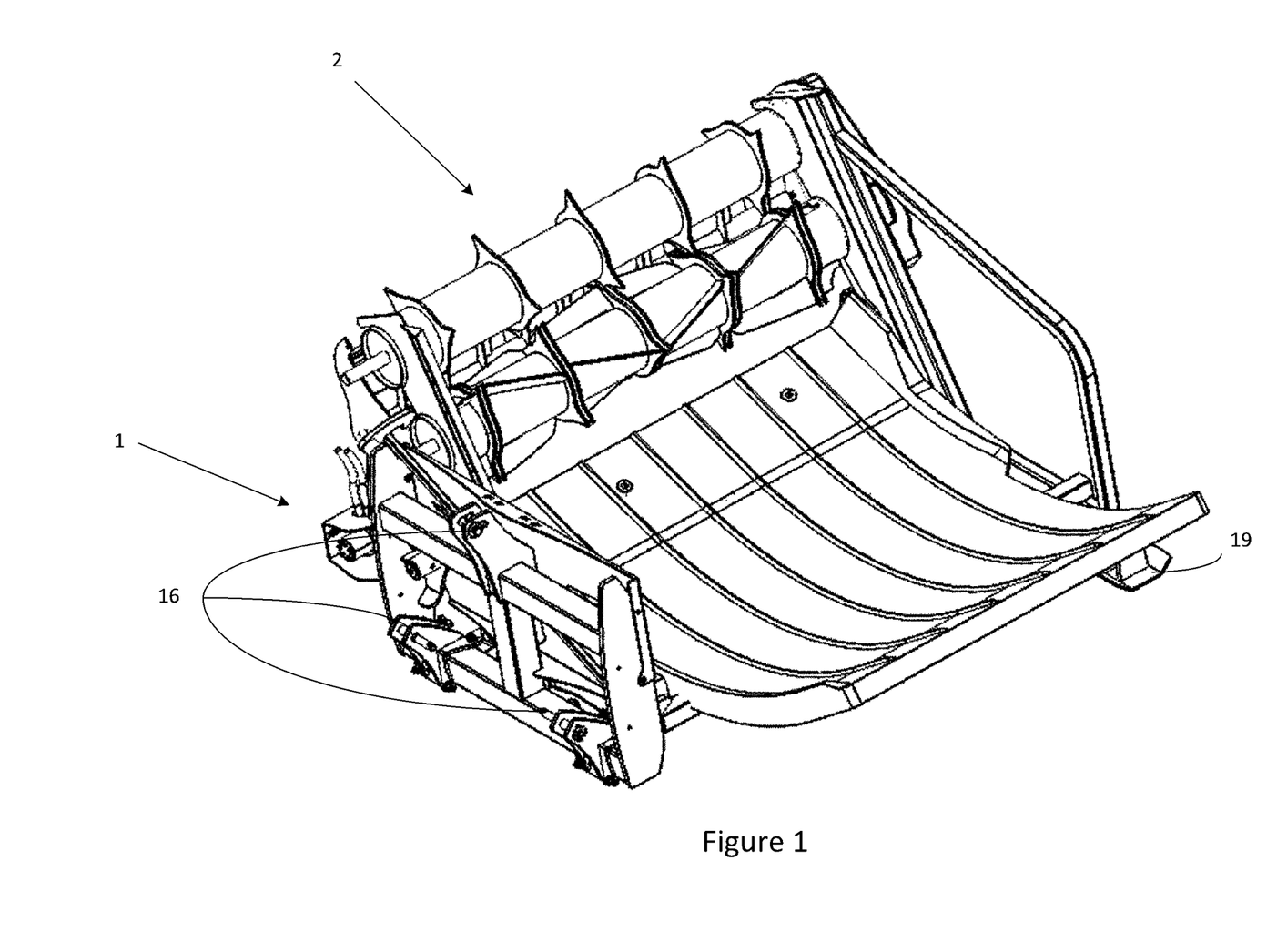
FIG. 1 shows a back perspective view of a fork and bale feeder assembly connected to a bale feeder.
Figure 2:
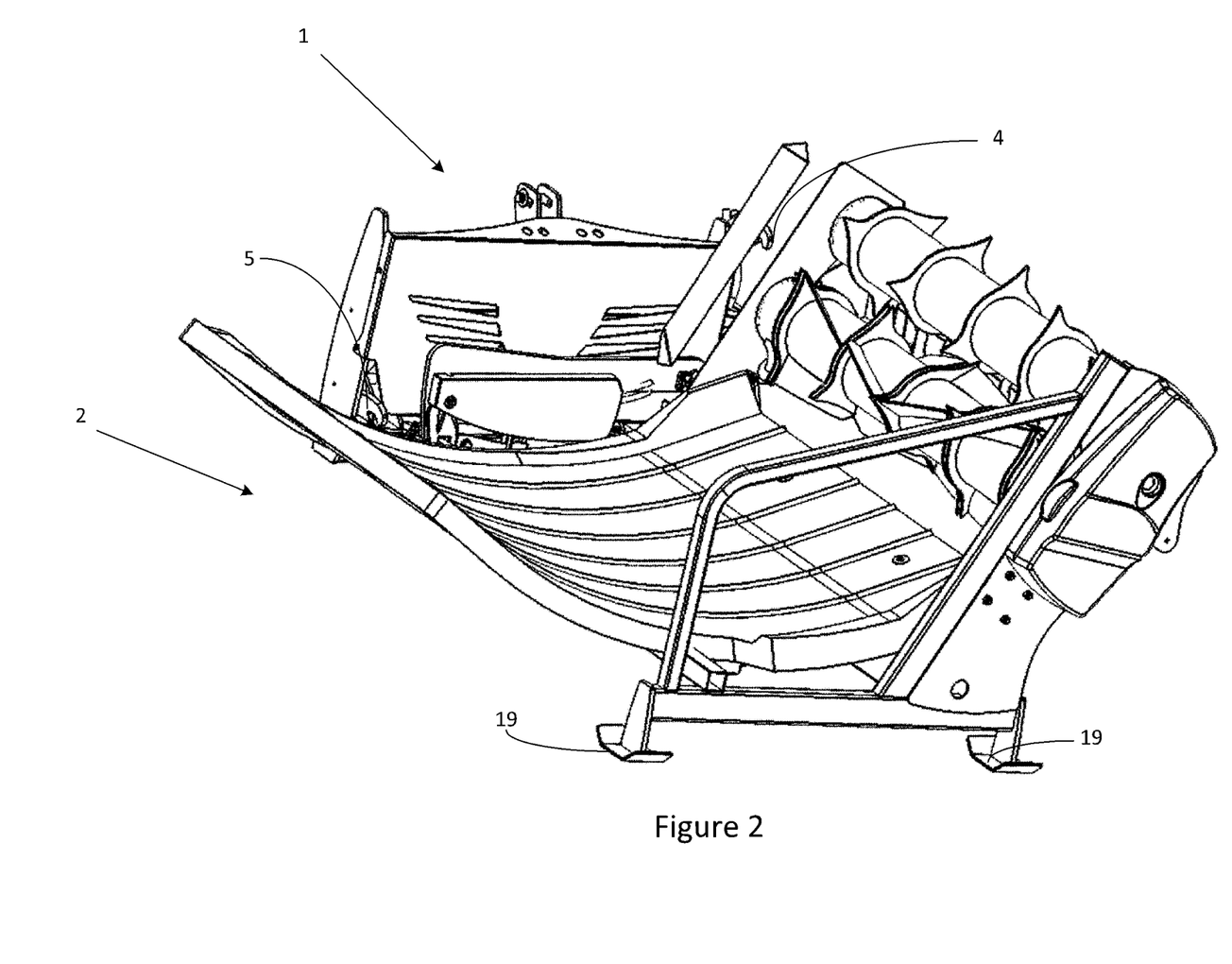
FIG. 2 shows a front perspective view of the fork and bale feeder assembly and bale feeder of FIG. 1.
Figure 3:
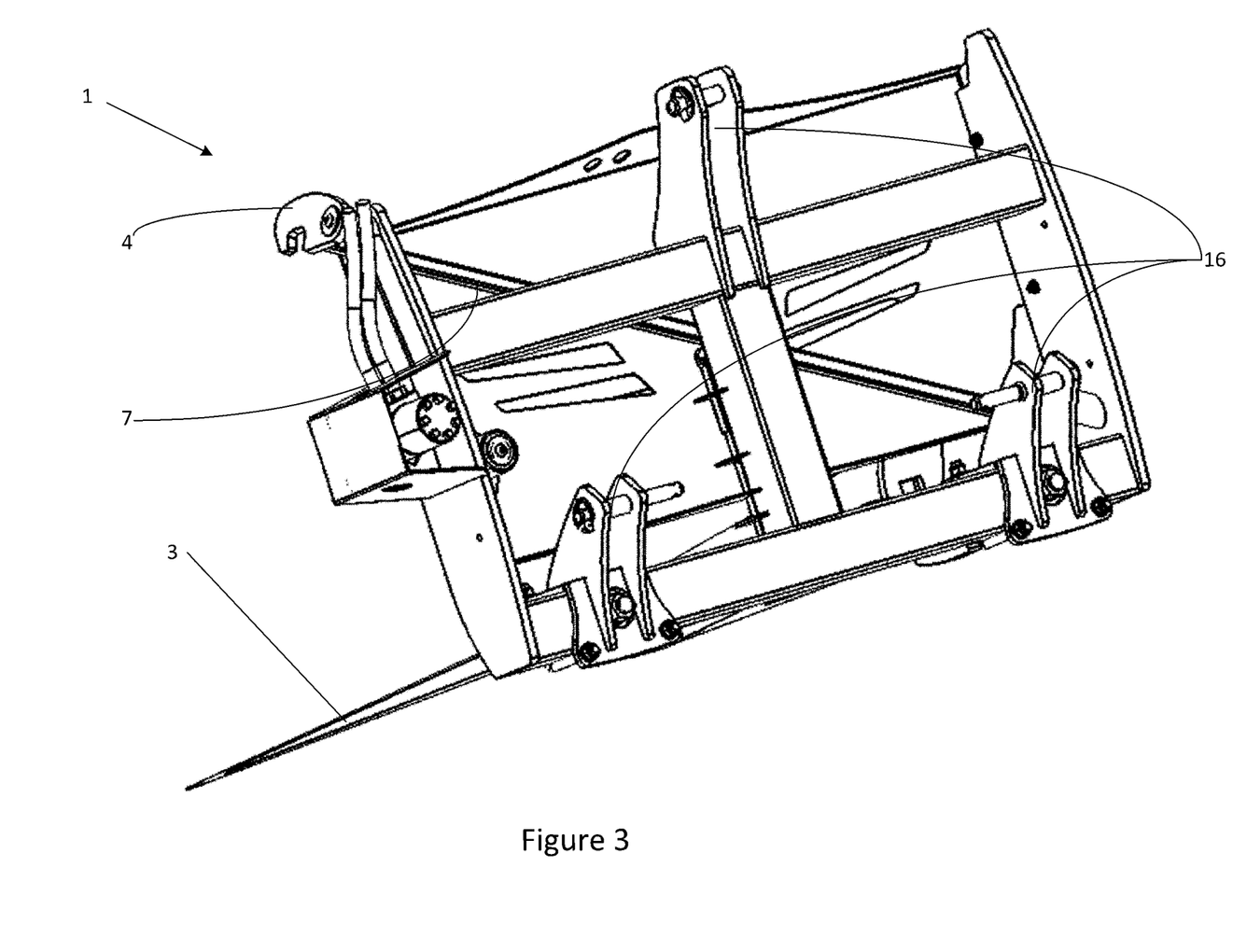
FIG. 3 shows a back perspective view of the fork assembly shown in FIG. 1.
Figure 4:
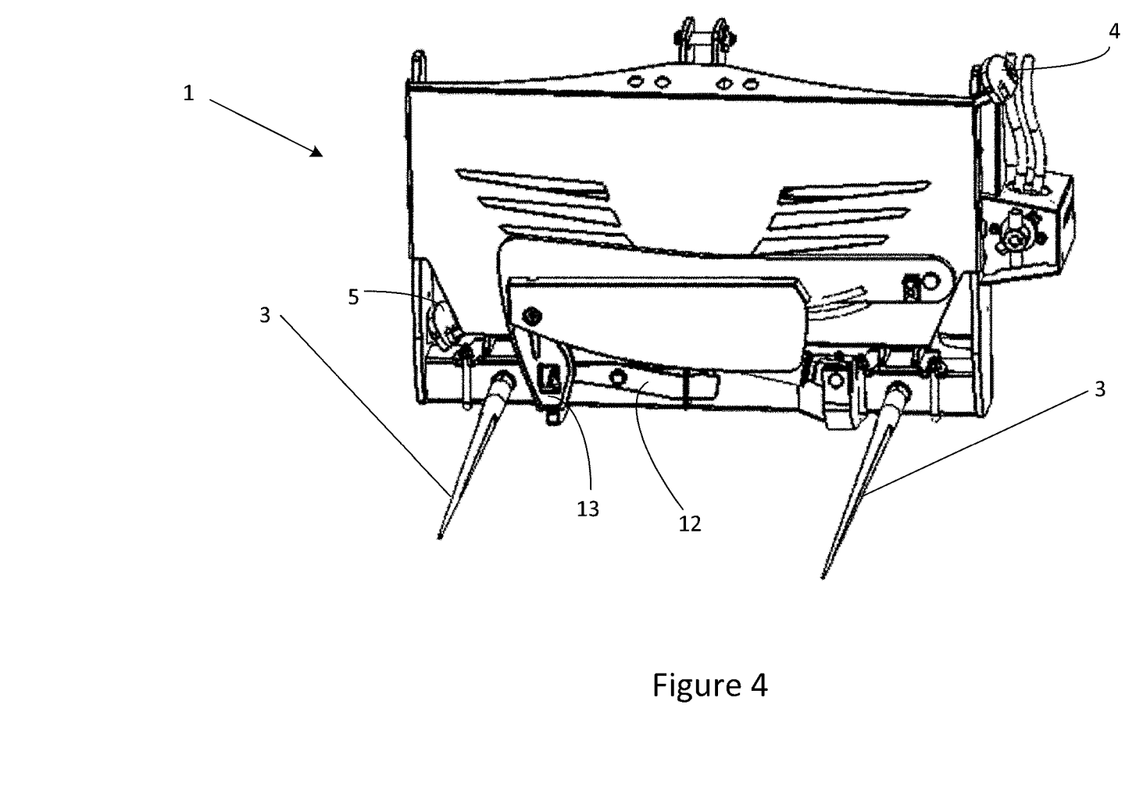
FIG. 4 shows a front perspective view of the fork assembly shown in FIG. 1.
Figure 5:
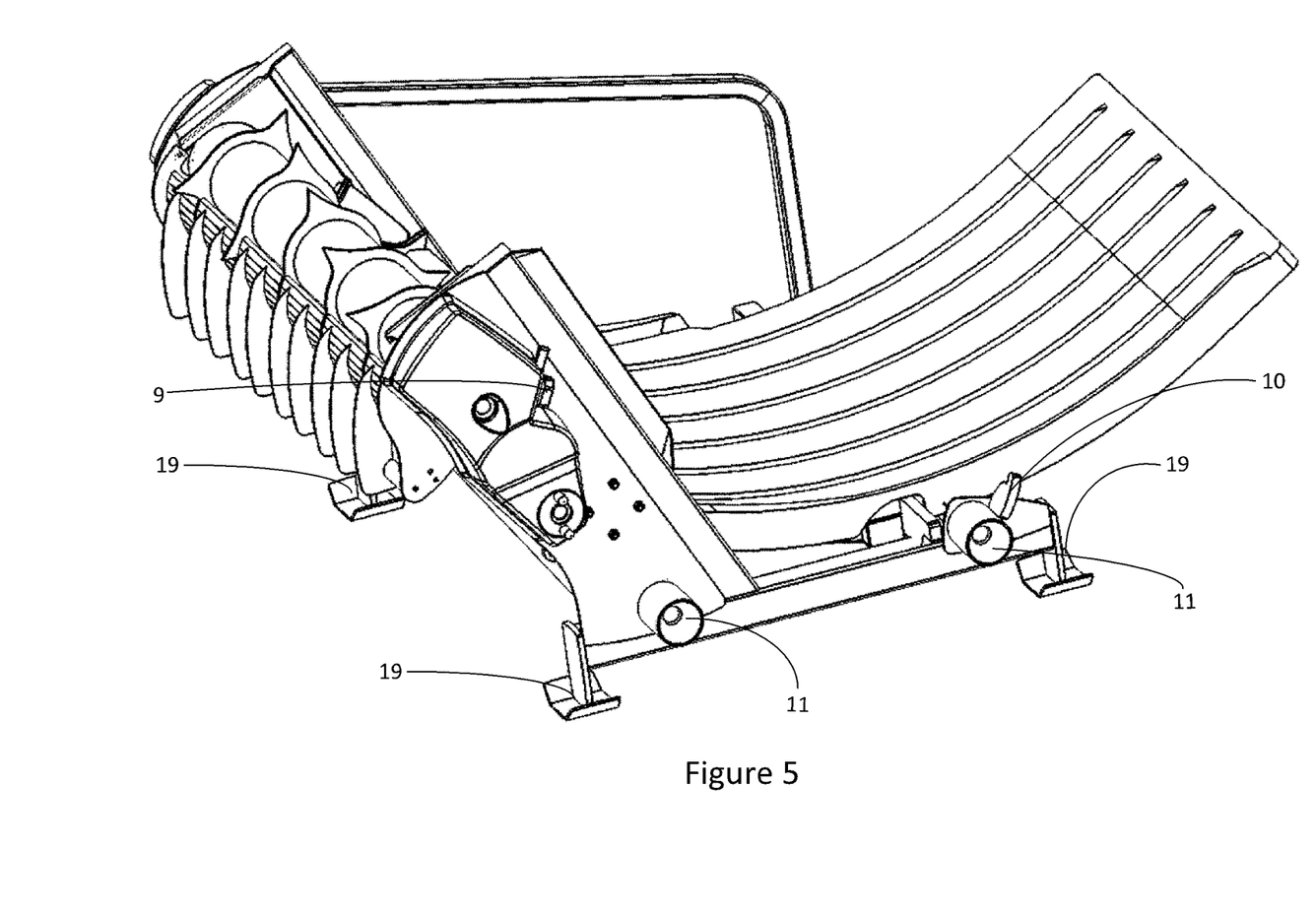
FIG. 5 shows a back perspective view of the bale feeder shown in FIG. 1.
Figure 6:
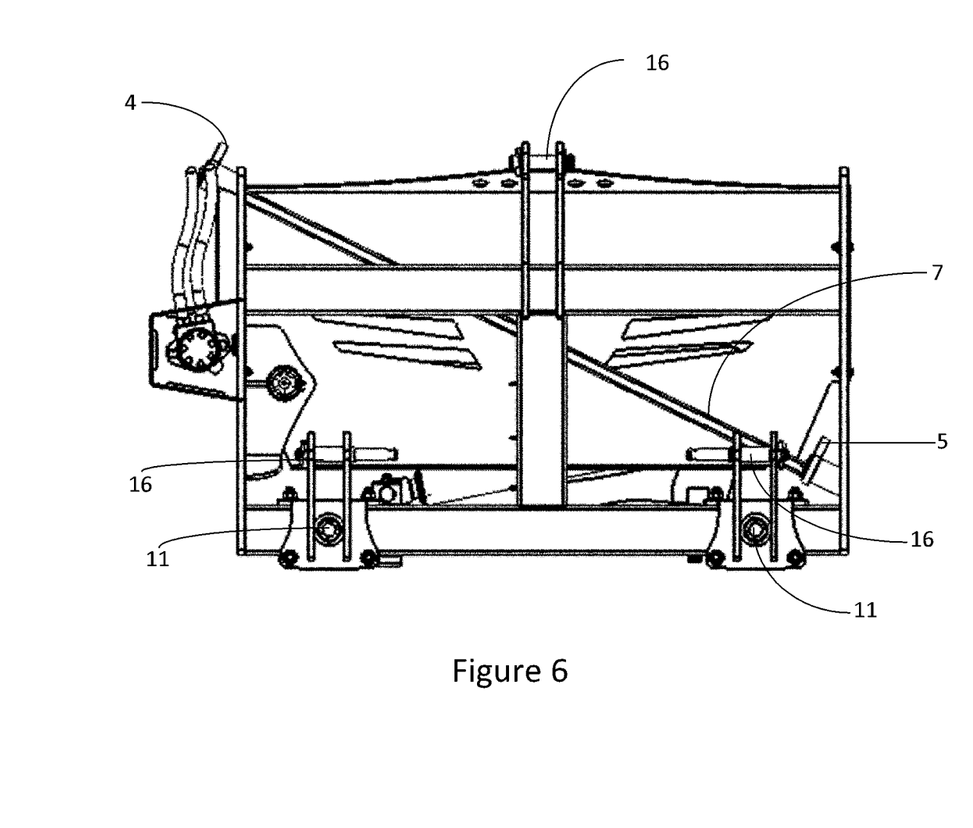
FIG. 6 shows a back view of the fork assembly shown in FIG. 1.
Figure 7:
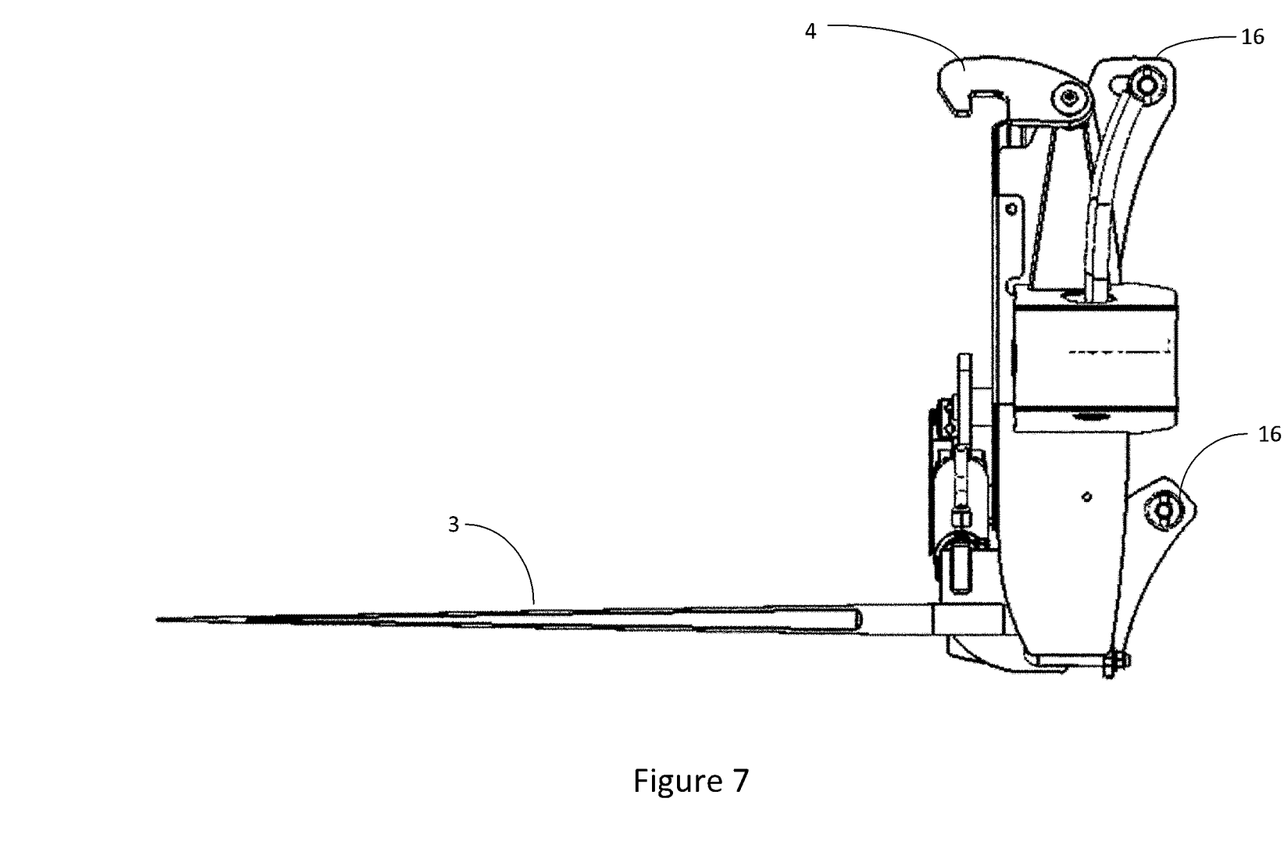
FIG. 7 shows a right side view of the fork assembly shown in FIG. 1.
Figure 8:
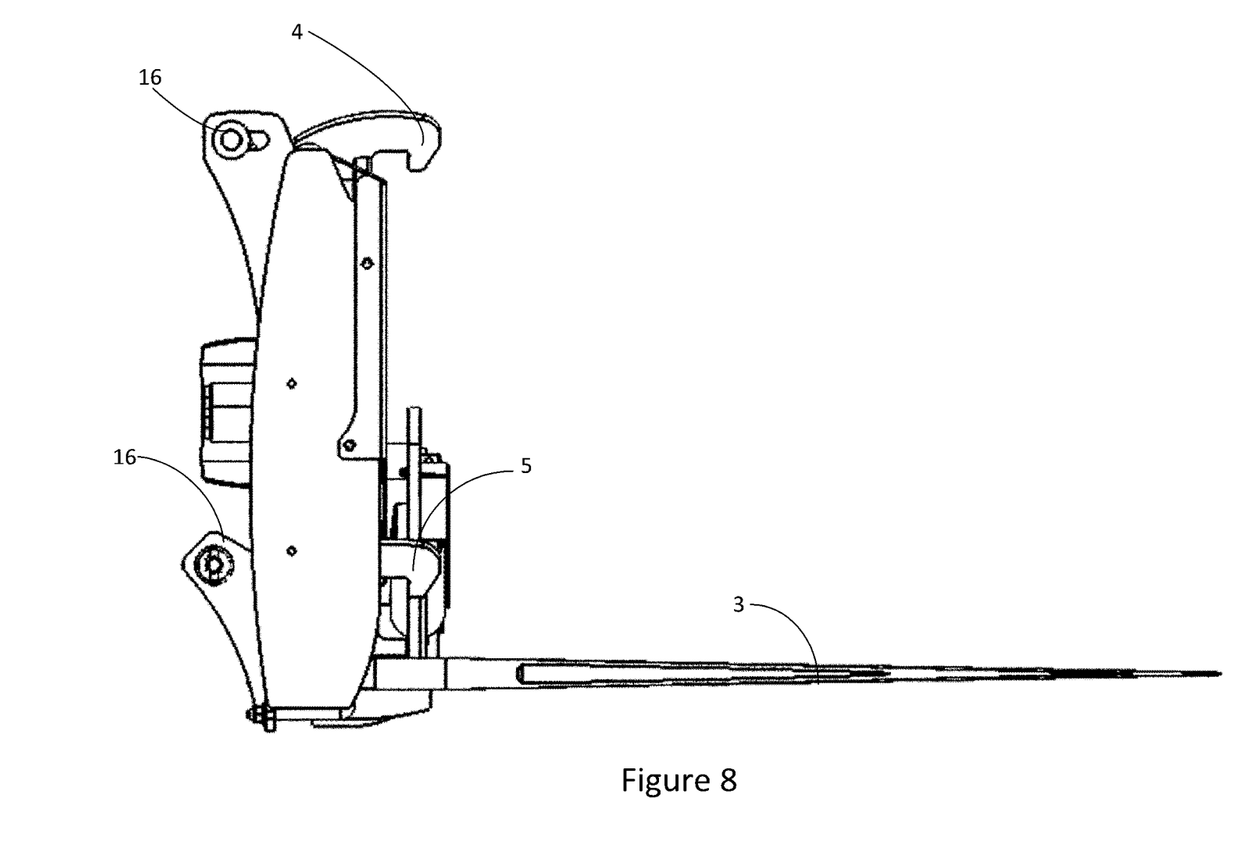
FIG. 8 shows a left side view of the fork assembly shown in FIG. 1.

FIGS. 3 and 4 show a fork assembly 1 for use with an agricultural machine in the form of a bale feeder 2 as shown in FIGS. 1, 2 and 5. In this case the fork assembly 1 includes a pair of tines 3, shown in FIGS. 3 and 4, although one or more tines may be employed and forks or the like may be substituted for tines. The terms "forks" and "tines" are intended to cover any element extending from a fork assembly that may be used to lift an agricultural machine such as pins etc. The tines 3 are received by sleeves 11 of the bale feeder as shown in FIG. 5.

Figure 9:
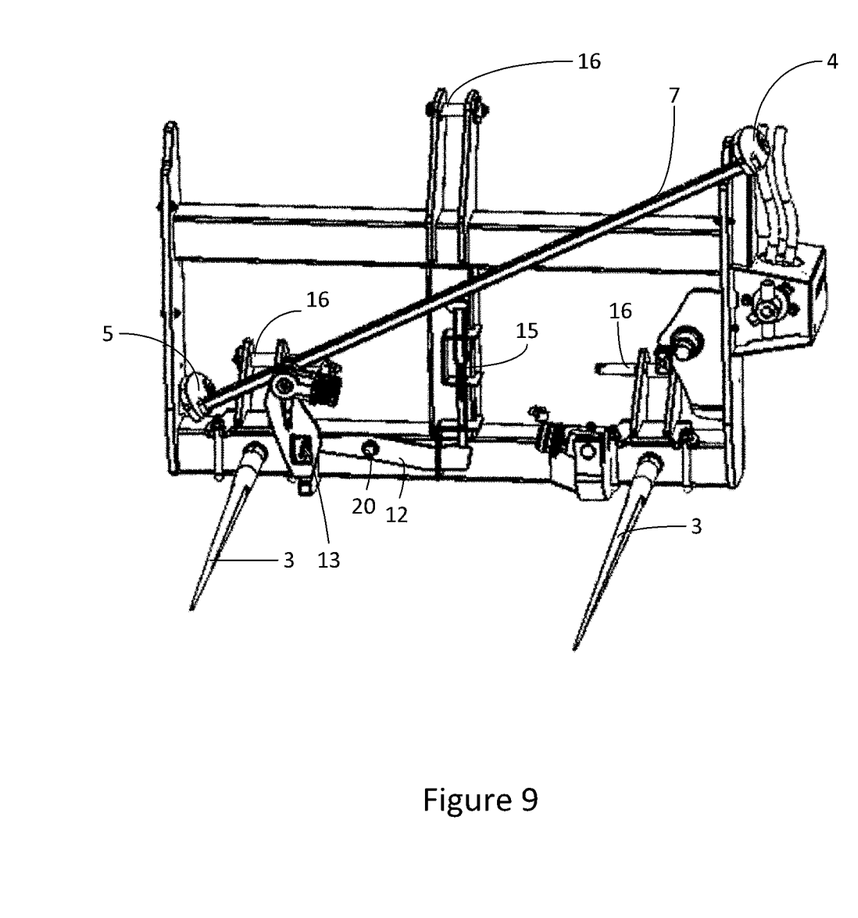
FIG. 9 shows a front perspective cutaway view of the fork assembly shown in FIG. 1.
Figure 10:
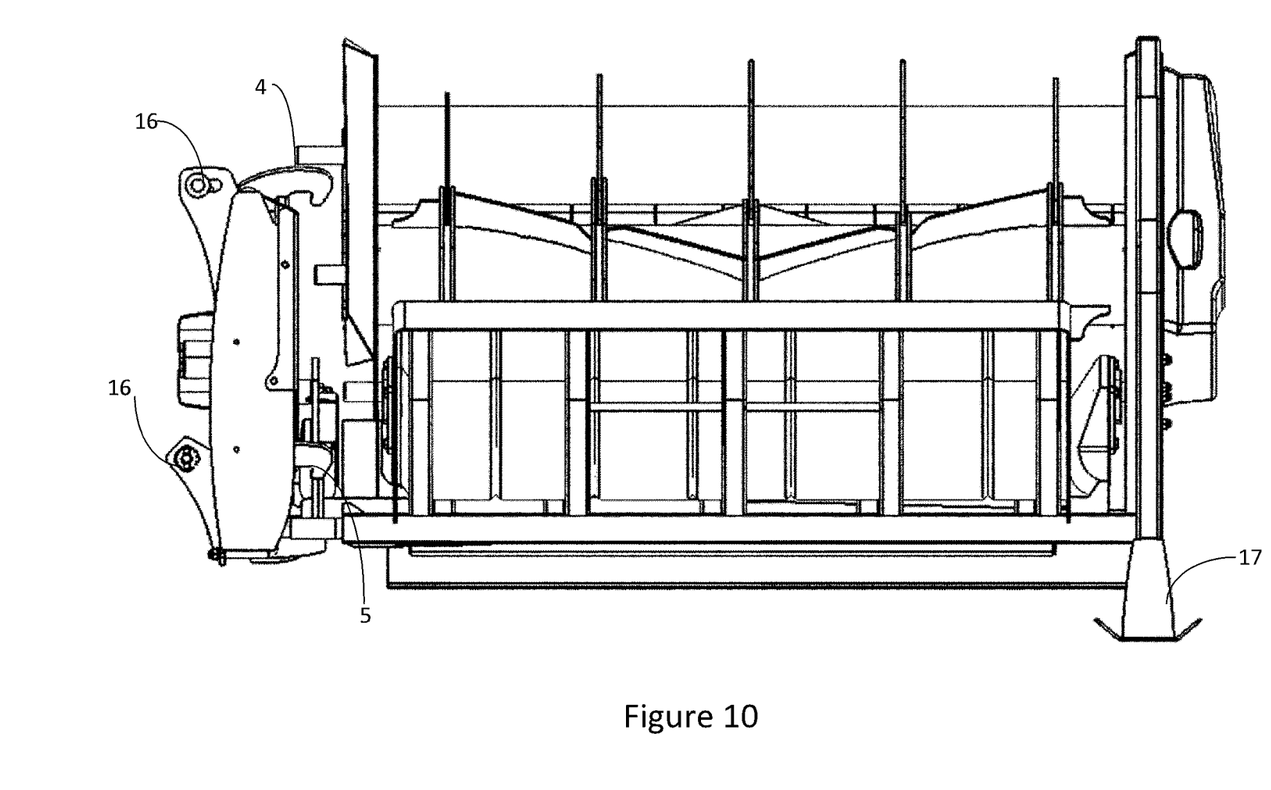
FIG. 10 shows a left side view of the bale feeder and fork assembly shown in FIG. 1.
Figure 11:
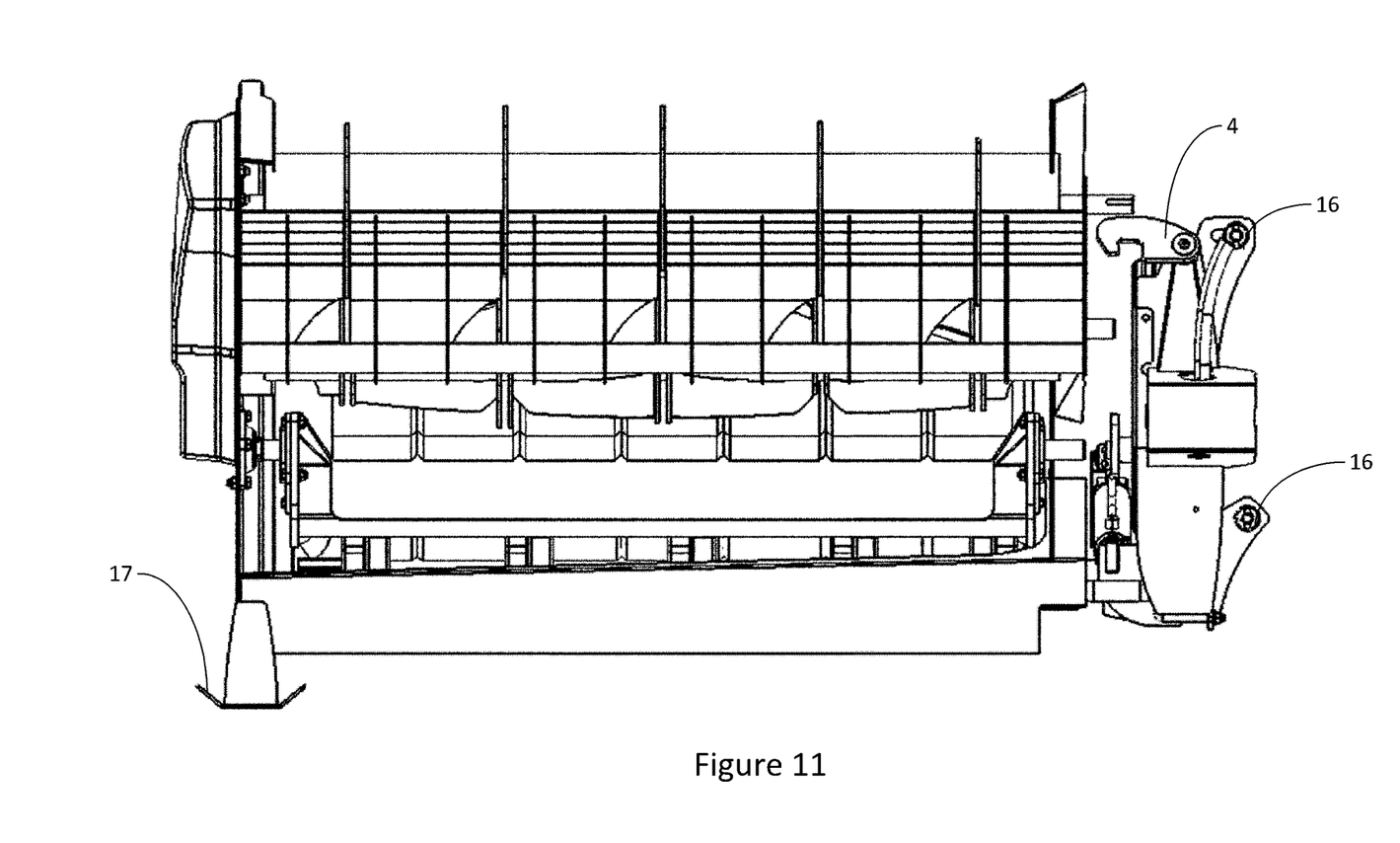
FIG. 11 shows a right side view of the bale feeder and fork assembly shown in FIG. 1.
Figure 12:
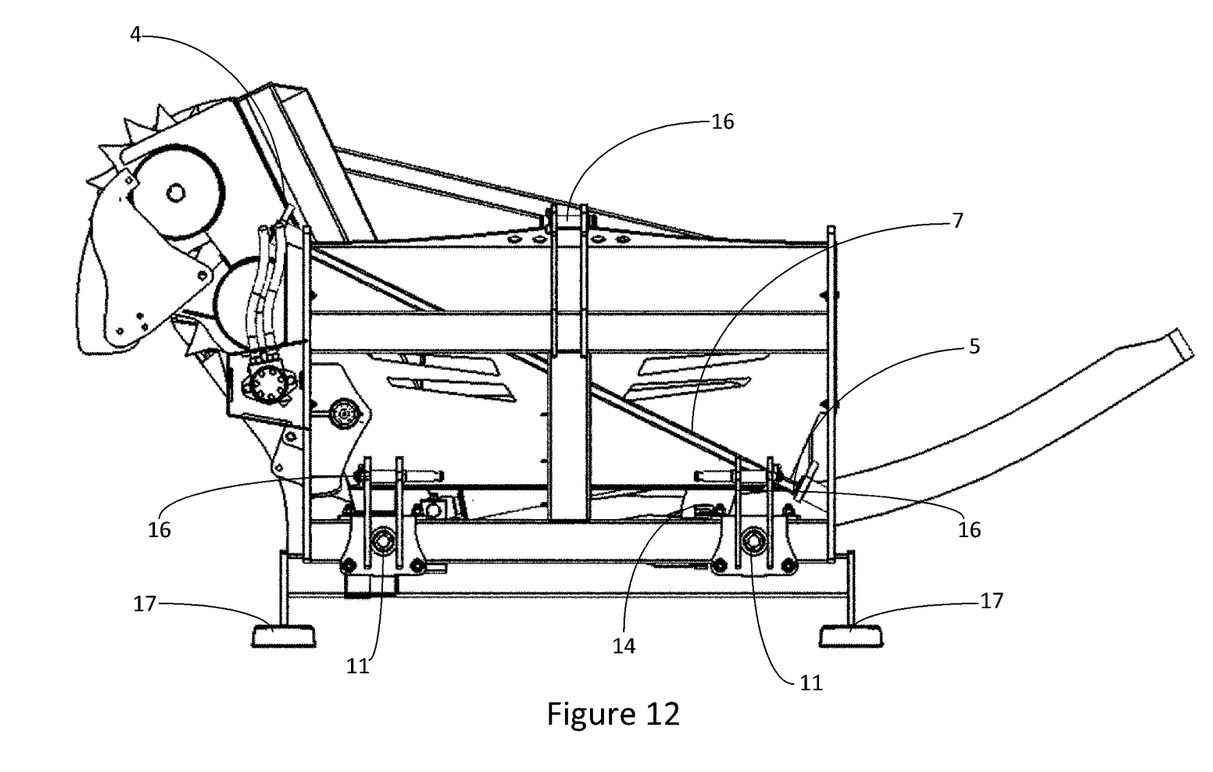
FIG. 12 shows a back view of the bale feeder and fork shown in FIG. 1.

Attached to the fork assembly is a retention mechanism that may take the form of a pair of latches 4 and 5 which are both attached to a common bar 7 (best shown in FIG. 9). The latches 4 and 5 may be raised and lowered so that they are able to hook onto fixed hooks 9 and 10 on the bale feeder 2 to retain it to the fork assembly and release the latched when required. The configuration of the latches may be for one to secure the top and the other to secure the bottom of the bale feeder to increases the stability and strength of the connection. Control element 13 is connected to a pivoting linkage 12 which is rotatable about pin 20. The end of linkage 12 remote from control element 13 is linked via sprung linkage 15 to bar 7. When a downward force is applied to control element 13 this causes sprung linkage 15 to be forced up. If there is no resistance this will cause bar 7 to raise latched 4 and 5. However, if there is resistance (as occurs when the agricultural machine is raised and there is friction holding laches together) then sprung linkage 15 will store the energy in a compressed state until the frictional force is removed and the latches may be lifted.

In use, the tines 3 of the fork assembly are fully engaged in the sleeve 11 of the baler 2. Platform 14 of the bale feeder 2 in normally lowered and forces back control element 13, which is sprung so that it may pivot towards the fork assembly. The latches 4 and 5 of fork assembly 1 engage with complementary latches 9 and 10 of bale feeder 2 to lock the baler to the fork assembly. The bale feeder can then be used to feed out a bale of hay, securely attached to the fork assembly.

In use platform 14 of the bale feeder is raised and the sprung end of control element 13 springs under it. When the platform 14 is lowered the control element 13 is now under it and lowering the platform on it causes pivotal linkage 12 to rotate about pin 20 and urge sprung linkage 15 upwards. If the bale feeder is on the ground then the upward force applied by sprung linkage 15 raises bar 7 and lifts pivoting latches 4 and 5 to allow the tines to be removed from the bale feeder.

However, if the bale feeder is still elevated, frictional forces between respective latches will prevent latches pivoting upwards to release. In this case the upwards force applied to sprung linkage 15 by pivotal linkage 12 will be stored as potential energy in sprung linkage 15 until the bale feeder is lowered and the frictional forces between the latches drops to a level at which the sprung linkage can raise latches 4 and 5 to allow the bale feeder to be released.

This arrangement has the advantage that the latches engage whilst the bale feeder is on the ground so that it may be maneuvered before it is lifted and the latches automatically disengage when the bale feed is lowered to the ground with the platform lowered.

The fork assembly may be attached to a conventional tractor or other agricultural vehicle using a three point linkage, with the attachment points 16 shown in FIGS. 1 and 3.

The bale feeder has feet 17, allowing it to be placed stably on the ground. The feet have skids 19 with upturned ends to assist movement when the fork assembly is lowered.

This configuration has the advantage that the mechanism need only be fitted to the fork assembly with only fixed hooks required on the item of agricultural machinery.

Figure 13:
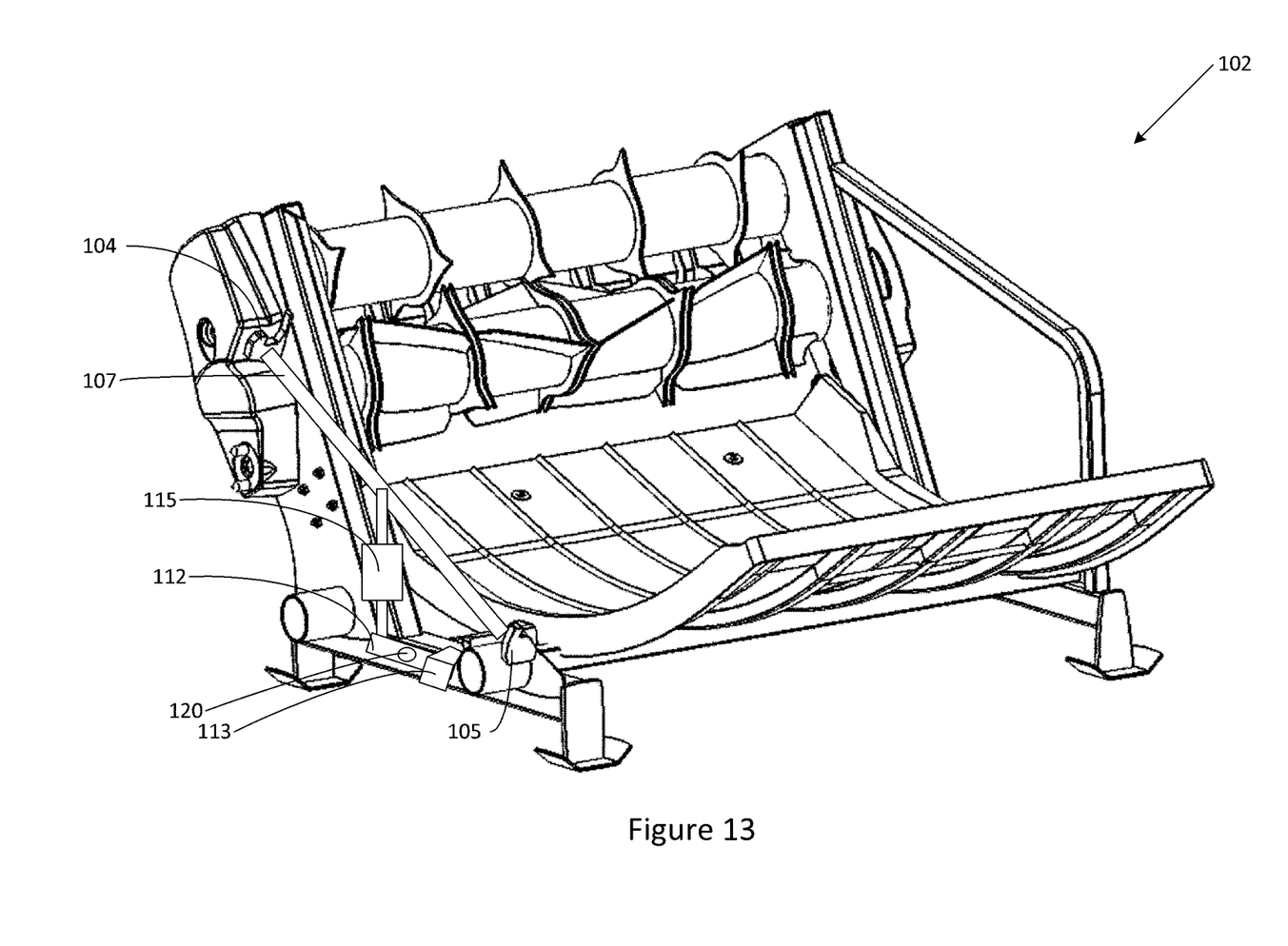
FIG. 13 shows an embodiment with the retention mechanism provided on an agricultural machine.

It is also possible that the moveable latches may be fitted to the bale feeder 102 as shown in FIG. 13. In this embodiment the bale feeder has a control element 113 which, when engaged by a platform on the bale feeder, rotates the opposite end of pivot arm 112 up, forcing sprung linkage 115 up, so as to raise latches 104 and 105 (if not restrained by friction when engaged with corresponding latched in the lifted position). When a fork assembly engages the bale feeder 102 the latches 104 and 105 engage corresponding latches on the fork assembly. To release the latches 104 and 105, the bale feeder platform must be lowered, forcing the platform onto the control element 113, causing it to actuate the pivot arm 112 and release the latches 104 and 105 via sprung linkage 115. This achieves the same mode of release as in the previous embodiment but is provided entirely on the bale feeder side.

Whilst the retention mechanism has been shown in the form of latches in the above embodiments it will be appreciated that a variety of mechanisms may be employed such as twist lock arrangements, locking pins etc. It will also be appreciated that one or more such mechanism may be employed.

Although the mechanism has been described with reference to a bale feeder, the same latching mechanism may be applied to other agricultural machinery where tines or forks are used to lift or maneuver the machinery. The advantage of using this type of latch is that it only requires a set of fixed hooks to be on the machinery, potentially allowing a farmer to use the same fork assembly with a variety of equipment.

There is thus provided a mechanism which effectively prevents an agricultural machine becoming disengaged from forks or tines when it is lifted. The retention mechanism utilizes existing movements of an attached machine for release of the retention mechanism and so does not require modification of the attached machine (other than affixing latches if not present). An operator is not required to manually latch or unlatch the equipment when it is attached or released. The mechanism may also be self-resetting to allow an agricultural machine to be re-engaged immediately after being disengaged. The mechanism assists in the correct positioning of forks or tines, reducing the chance of damage to equipment or tractor. The latches will connect before lifting the machine off the ground—ensuring the machine is effectively retained before completely lifted off the ground.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A fork assembly for attachment to an agricultural machine, the agricultural machine having a remotely controllable moveable element that is moveable between at least a first and a second position, the fork assembly including:
   a. a fork having one or more tines; and
   b. a retention mechanism for locking the agricultural machine to the fork assembly, the retention mechanism including a control element positioned so that, when engaged with the agricultural machine, the movement of the control element due to movement associated with the remotely controllable moveable element is arranged to cause activation and deactivation of the retention mechanisms;
   wherein the retention mechanism includes one or more pivoting latches and wherein the control element raises each latch to release it when the control element is forced down.

2. A fork assembly according to claim 1 wherein the retention mechanism is a latching mechanism.

3. A fork assembly according to claim 1 wherein the retention mechanism includes a pair of latches.

4. A fork assembly according to claim 3, wherein the pair of latches are linked together by a bar.

5. A fork assembly according to claim 3, wherein the latches are on the same face of the fork assembly, with one latch on the top of one side of the face, and the other is on the bottom of the of the opposite side of the face.

6. A fork assembly according to claim 1 wherein the control element acts through a pivotal linkage to convert downward force applied by the moveable element into an upward force raising each latch.

7. A fork assembly according to claim 6 wherein the control element drives a bar that links together the pair of latches through a sprung linkage.

8. An agricultural machine assembly including:
a. a fork assembly having one or more forks or tines;
b. an agricultural machine arranged to engage via the one or more forks or tines, the agricultural machine having a remotely controllable moveable element that is moveable between at least a first and a second position; and
c. a retainer which locks the agricultural machinery to the fork assembly, the retainer being controlled by a control element that engages with the moveable element of the agricultural machine to cause activation and deactivation of the retainer as the moveable element is moved between the first and second position.

9. An agricultural machine assembly according to claim 8, wherein the agricultural machine is a bale feeder.

10. An agricultural machine assembly including:
a. a fork assembly having one or more forks or tines;
b. an agricultural machine arranged to engage via the one or more forks or tines, the agricultural machine having a remotely controllable moveable element that is moveable between at least a first and a second position; and
c. a latch or lock which locks the agricultural machinery to the fork assembly, the latch or lock being controlled by an engagement member having an engagement surface that engages with the moveable element of the agricultural machine to operate the latch or lock as the moveable element is moved between the first and second positions.

11. The agricultural machine assembly of claim 10, wherein the latch or lock comprises a pair of latches linked together by a bar.

12. The agricultural machine assembly of claim 11, wherein the engagement member is linked to the bar via a pivotal arm.

13. The agricultural machine assembly of claim 12, wherein the pivotal arm is linked to the bar via a sprung linkage.

* * * * *

UNITED STATES PATENT AND TRADEMARK OFFICE
CERTIFICATE OF CORRECTION

PATENT NO.          : 11,096,330 B2
APPLICATION NO.     : 16/341744
DATED               : August 24, 2021
INVENTOR(S)         : James Robert Currie et al.

Page 1 of 1

It is certified that error appears in the above-identified patent and that said Letters Patent is hereby corrected as shown below:

In the Claims

Column 4, Lines 54-55, Claim 1:
"... the retention mechanisms;"
Should be:
-- ... the retention mechanism; --

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*